United States Patent
Muhr-Sweeney

(10) Patent No.: US 7,214,275 B2
(45) Date of Patent: *May 8, 2007

(54) METHOD FOR CLEANING INTERNAL COMPONENTS OF ELECTRONIC EQUIPMENT

(76) Inventor: Audrey Muhr-Sweeney, 20 Gloria La., Huntington, NY (US) 11743

( * ) Notice: Subject to any disclaimer, the term of this patent is extended or adjusted under 35 U.S.C. 154(b) by 0 days.

This patent is subject to a terminal disclaimer.

(21) Appl. No.: 11/156,804

(22) Filed: Jun. 20, 2005

(65) Prior Publication Data

US 2005/0229949 A1    Oct. 20, 2005

Related U.S. Application Data

(63) Continuation of application No. 10/644,471, filed on Aug. 20, 2003, now Pat. No. 6,923,870, which is a continuation of application No. 10/039,437, filed on Nov. 9, 2001, now Pat. No. 6,618,890, which is a continuation of application No. PCT/US00/12926, filed on May 11, 2000.

(60) Provisional application No. 60/133,444, filed on May 11, 1999, provisional application No. 60/133,443, filed on May 11, 1999.

(51) Int. Cl.
*B08B 7/00* (2006.01)

(52) U.S. Cl. ............... 134/6; 134/8; 134/9; 134/15; 15/104.002

(58) Field of Classification Search ............ 134/6, 134/8, 9, 15, 42; 15/104.002
See application file for complete search history.

(56) References Cited

U.S. PATENT DOCUMENTS

| | | | |
|---|---|---|---|
| 5,227,844 A | 7/1993 | Bhattacharjee et al. | |
| 5,525,417 A | 6/1996 | Eyler | |
| 5,536,328 A | 7/1996 | Morgavi | |
| 5,616,386 A * | 4/1997 | Okada et al. | 428/40.1 |
| 5,891,259 A | 4/1999 | Ikeda et al. | |
| 6,618,890 B2 | 9/2003 | Muhr-Sweeney | |
| 6,923,870 B2 | 8/2005 | Muhr-Sweeney | |
| 2004/0017458 A1 | 1/2004 | Conwell | |

FOREIGN PATENT DOCUMENTS

| | | |
|---|---|---|
| JP | 63114691 A | 5/1988 |
| WO | WO 93/21020 | 10/1993 |

OTHER PUBLICATIONS

Informational Brochure-MIPOX International Corporation.
Informational Brochure—3M Imperial Microfinishing Film, 1991.

* cited by examiner

*Primary Examiner*—Zeinab El-Arini
(74) *Attorney, Agent, or Firm*—Carter, DeLuca, Farrell & Schmidt, LLP

(57) ABSTRACT

A method of cleaning a head of a printer when the printer is in a normally-engaged position is disclosed. A step of the method includes providing a base a material with a leading end and trailing end. Another step includes providing an abrasive cleaning sheet which has distal and proximal ends. The abrasive cleaning sheet is located proximate to the leading end of the base material. At least the proximal end of the abrasive cleaning sheet is adhered to the base material. The next method step includes feeding the base material into a printing path of a printer and then moving the base material at least partially through the printer so the abrasive cleaning sheet contacts at least a head of the printer.

5 Claims, 4 Drawing Sheets

METHOD FOR CLEANING INTERNAL COMPONENTS OF ELECTRONIC EQUIPMENT

CROSS REFERENCE TO RELATED APPLICATIONS

This application is a continuation of U.S. patent application Ser. No. 10/644,471 filed on Aug. 20, 2003 now U.S. Pat. No. 6,923,870 which is a continuation of U.S. patent application Ser. No. 10/039,437 filed on Nov. 9, 2001, now U.S. Pat. No. 6,618,890, which is a continuation of PCT application Ser. No. PCT/US00/12926 filed by Audrey Muhr-Sweeney on May 11, 2000 which claims the benefits of and priority to U.S. Provisional Applications Ser. Nos. 60/133,444 entitled "CLEAN LEADER CARD" and 60/133,443 entitled "UNIVERSAL CLEANING CARD" both of which were filed on May 11, 1999 by Audrey Muhr-Sweeney, the entire contents of each of these applications are hereby incorporated by reference herein.

BACKGROUND

The present disclosure relates to a cleaning apparatus designed to clean a wide array of computer peripheral devices, e.g., printers, smart card readers, magnetic readers and the like. More particularly, the present disclosure relates to a universal cleaning card-like apparatus which has a dual cleaning function: 1) to clean and polish the rollers and reading, writing or scan heads (hereinafter "r/w/s heads") of printers, facsimile machines, copiers, photo and optic sensors, chips, internal optics, smart card readers, smart chips, bar code encoders and decoders, magnetic readers, scanners and/or the like; and 2) to remove lint, dust, paper dust, magnetic oxides, contaminants and/or other residue from the r/w/s heads, feed or follower rollers/bars disposed along the paper (or r/w/s head path).

Heretofore, an alcohol-based solution, e.g., isopropyl alcohol, has been used with some success to clean the heads of the above-mentioned or similar such devices. However, it is known that alcohol-based solutions can detrimentally affect the life of the more sensitive, internal working components of these devices, e.g., repeated cleaning with an alcohol-based solution can affect the elasticity of the feed or follower rollers/bars and/or r/w/s/heads. Moreover, it is also known that bulk shipping of alcohol-based solutions can often be difficult and may require special permits and/or less than efficient shipping methods due to certain countries classifying alcohol-based solutions as hazardous or unsafe substances.

Other known cleaning devices employ abrasives on one or both sides of the cleaning sheet to remove contaminants. However, it is known that these abrasives may cause unnecessary wear of the feed or follower rollers and/or the r/w/s heads.

Thus, there exists a need for a new, simple, yet effective, cleaning apparatus and method according to same for both cleaning the roller and heads of certain electronic equipment and removing excess residue from the rollers and heads without compromising the integrity of the internal working components of the equipment.

SUMMARY

The present disclosure relates to a cleaning apparatus for cleaning and decontaminating the internal working components of a piece of electronic equipment along a predetermined media path and includes a base material having first and second surfaces. The cleaning apparatus also includes a cleaning substrate disposed on the first surface for cleaning at least one internal working component of the electronic equipment and an adhesive substrate disposed on one of the first and second surfaces for decontaminating at least one internal working component of the electronic equipment.

In one embodiment of the present disclosure, the base material is a lapping film. In a separate embodiment, the cleaning substrate is selected from the group consisting of: aluminum oxide, calcined alumina, cerium oxide, chromium oxide, diamond, ferrous oxide, silicon carbide, silicon dioxide and cubic boron nitrate minerals.

In yet another separate embodiment of the present disclosure, the cleaning substrate and the adhesive substrate are disposed on the first surface. In some cases it may be preferable to include the cleaning substrate and the adhesive substrate on the first surface in sections in an alternating manner.

Advantageously, the base material is semi-compliant and is dimensioned in the shape of a data-carrying card. However, the base material can be manufactured in a variety of shapes and sizes for utilization with different electronic devices.

In one embodiment, the adhesive substrate includes a first adhesive for adhering to one of the surfaces of the base material and a second adhesive for decontaminating the internal working components of the electronic equipment as the cleaning apparatus moves along the predetermined media path. In some cases, however, it may be preferable to thermally incorporate the adhesive material onto one of the surfaces of the base material.

The adhesive substrate can be any known adhesive, e.g., chemical adhesives (i.e., latex, acrylic, resin, silicone, neoprene and urethane) pressure sensitive adhesives, contact adhesives, aerosol adhesives, epoxies, solvent-based adhesives, water-based adhesives, curing adhesives, cyanoacrylate adhesives, heat-activated & heat re-activated adhesives and/or cohesive adhesives.

The present disclosure also relates to a method for cleaning and decontaminating the internal working components of a piece of electronic equipment along a predetermined media path. The method includes the steps of:

1) providing a base material having first and second surfaces, the base material having a cleaning substrate disposed on the first surface and an adhesive substrate disposed on the second surface;

2) inserting the base material into the electronic equipment along the predetermined media path; and 3) moving the base material through the predetermined media path such that the cleaning substrate cleans and polishes at least one internal working component of the electronic equipment and the adhesive substrate decontaminates at least one internal working component of the electronic equipment.

The method may also include the steps of:

4) removing the base material from the electronic equipment;

5) reorienting the base material such that the other of the first and second surfaces is oriented to contact at least one additional internal working component of the electronic equipment; and 6) moving the base material through the predetermined media path such that one of the cleaning substrate and the adhesive substrate contacts the at least one additional internal working component of the electronic equipment.

In another method according to the present disclosure, one of the first surface and second surfaces of the base material of the providing step includes both a cleaning substrate and an adhesive substrate thereby eliminating the need to implement steps (4) through (6) above.

In another embodiment, the cleaning apparatus includes a base material having first and second surfaces and a cleaning substrate disposed on the first surface for cleaning at least one internal working component of the electronic equipment. The base material also includes a first adhesive substrate disposed on the first surface for decontaminating at least one internal working component of the electronic equipment and a second adhesive substrate disposed on the second surface for adhering the base material to a roll of stock used with the electronic equipment.

A plurality of base material may be adhered to the stock at varying locations.

In one embodiment, the present disclosure relates to a cleaning apparatus with an integrated cleaning sheet for cleaning the internal working-components of a printer along a predetermined media path and includes a base material having a leading end and a trailing end. An abrasive cleaning sheet having distal and proximal ends is disposed proximate the leading end of the base material. At least the distal end of the abrasive cleaning sheet is adhered to the base material. To clean an internal component of electronic equipment, the abrasive cleaning sheet is fed through the reading, writing or scan heads (nw/s heads) of a printer when the printer is disposed in a normally-engaged position to remove residue.

In one embodiment, the base material contains a plurality of labels.

In one embodiment, the abrasive cleaning sheet is coated with aluminum oxide.

In one embodiment, the base material includes a printer ribbon and the cleaning sheet is for cleaning internal components of a printer. An adhesive strip is disposed on the cleaning sheet to adhere the cleaning sheet to the printer ribbon.

In one embodiment, the present disclosure relates to an apparatus for cleaning the internal working components of a piece of electronic equipment and includes a base material with a first surface, a second surface, a leading end and a trailing end. An abrasive cleaning strip is attached to at least one of the first and second surfaces of the base material and it includes an adhesive disposed thereon. The base material is then fed through the piece of electronic equipment for cleaning and decontaminating the internal working components thereof when the electronic equipment is disposed in a normally engaged position. The abrasive cleaning strip may be used to clean at least one of a reading, writing or scan head of a printer. The abrasive cleaning strip may be attached to the leading end of the base material. The base material may be configured as a roll of printer ribbon. The abrasive cleaning strip may include a cleaning substrate, which may be selected from the group consisting of aluminum oxide, calcined alumina, cerium oxide, chromium oxide, diamond, ferrous oxide, silicon carbide, silicon dioxide and cubic boron nitride minerals.

The present disclosure also relates to a method of cleaning a head of a printer. This method includes providing a base material having a leading end and a trailing end; and providing an abrasive cleaning sheet with distal and proximal ends and being disposed proximate the leading end of the base material, at least the distal end of the abrasive cleaning sheet is adhered to the base material. The method also includes feeding the base material into the printing path of a printer when the printer is disposed in a normally-engaged position and moving the base material at least partially through a printer such that the cleaning sheet contacts at least a head of a printer.

BRIEF DESCRIPTION OF THE DRAWINGS

Other objects and features of the present disclosure will become apparent from the following detailed description considered in connection with the accompanied drawings. It should be understood, however, that the drawings are designed for the purpose of illustration only and not as a definition of the limits of the present disclosure.

An illustrative embodiment of the subject cleaning apparatus and method are described herein with reference to the drawings wherein.

DETAILED DESCRIPTION

Figure 1A:
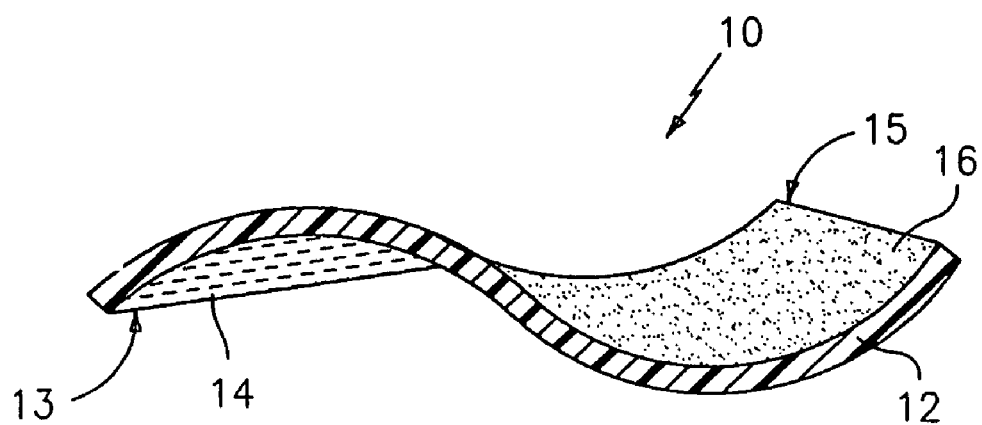
FIG. 1A is a perspective view of a cleaning apparatus or sheet constructed in accordance with one embodiment of the present disclosure which includes a base material having a first surface coated with a cleaning substrate and an opposite or second surface coated with an adhesive-like substrate.

Referring now in detail to the drawing figures in which like reference numerals identify similar or identical elements, one embodiment of the present disclosure is illustrated generally in FIG. 1 and is designated therein a cleaning apparatus or cleaning sheet 10. As shown in the accompanying drawings, cleaning sheet 10 is dimensioned generally rectilinear in shape to fit through and effectively clean and polish the internal working components of a piece of electronic equipment as the cleaning sheet moves along the predetermined media path of the equipment. It is not beyond the scope of the present disclosure to manufacture cleaning sheet 10 in other known shapes to clean other electronic equipment. As can be appreciated and by way of example, cleaning sheet 10 can be shaped in the form of a data card to clean magnetic or smart card readers, label-shaped to clean various types of labeling machines and sheet-like to clean printers, facsimile machines, copiers and the like.

For the purposes herein the term "internal working components" of electronic equipment is defined to include, but is not limited to: static and kinetic rollers/bars, r/w/s heads, magnetic heads, internal optics, and sensors. The term "electronic equipment" as used herein includes printers (i.e., polyvinylchloride PVC printers, direct printers, thermal transfer printers and the like), copiers, facsimile machines, scanners, bar code readers, smart card readers, magnetic readers, optical readers, electronic typewriters or any other piece of electronic equipment which includes sensitive internal components which should be cleaned on a regular basis. The term "predetermined media path" is defined herein as the path in which media, e.g., paper, labels, scanned items, data cards, smart cards, magnetic cards, bar encoded items, and the like must travel to either print, read, write, scan or otherwise incorporate data. The term "proximal", as is traditional, will refer to the end of the apparatus which is closer to the user, while the term "distal" will refer to the end which is further from the user.

Cleaning sheet 10 includes a base material 12, e.g., a lapping film, which may be made from polyurethane, polyvinylchloride (PVC), acrylic, PET, ABS, thermoplastic, polyester and/or thermoresin or any combination thereof which includes a first surface 13 and an opposite surface 15. It is envisioned that base material 12 can also include acrylic foam, urethane, polyethylene with synthetic paper, cardboard stock, paper, non-woven paper, fiber and/or synthetic suede. As mentioned above, base material 12 may also vary in thickness depending upon a particular purpose and/or the particular piece of electronic equipment being cleaned.

At least one surface of the lapping film 12, e.g., surface 13, may be coated with a first material 14 selected from the group consisting of aluminum oxide, calcined alumina, cerium oxide, chromium oxide, diamond, ferrous oxide silicon carbide, silicon dioxide (and/or the like and/or any combination thereof). It is known that the amount of first material 14 (hereinafter "cleaning substrate 14") deposited on the base material 12, e.g., lapping film, will directly correlate to the overall cleaning aggressiveness, i.e., effectiveness, of the cleaning substrate. The amount of chemical substrate 14 is typically measured in micron grade. For example, 3M manufactures lapping films having a micron grade range of about 0.1 microns to about 60 microns. Other known lapping films 12 which are manufactured with the chemical substrate 14 disposed on a single side for cleaning and polishing the electronic equipment may also be employed as part of the base material 12 for the presently disclosed cleaning apparatus.

As best illustrated in FIG. 1A, the second or opposite surface 15 of the lapping film 12 is coated with a second material 16 with adhesive properties. The adhesive substrate can be any known adhesive, e.g., chemical adhesive (i.e., latex, acrylic, resin, silicone, neoprene and urethane) pressure sensitive adhesives, contact adhesives, aerosol adhesives, epoxies, solvent-based adhesives, water-based adhesives, curing adhesives, cyanoacrylate adhesives, heat-activated & heat re-activated adhesives and/or cohesive adhesives.

As explained in more detail below, the cleaning sheet performs a dual cleaning function: 1) to clean the r/w/s heads (or rollers) of printers (i.e., polyvinylchloride PVC printers, direct printers, thermal transfer printers or the like), facsimile machines, photo and optic sensors, smart card readers, internal optics magnetic readers and/or other internal working components of electronic equipment; and 2) to decontaminate, i.e., remove contaminants (e.g., lint, dust, paper dust, magnetic oxides and/or other residue), from the r/w/s heads and rollers disposed along the paper, r/w/s head path.

As explained in more detail below with respect to FIG. 3, this enables a user to clean the feed 50a and 50b and/or follower rollers 60a and 60b and r/w/s head(s) 75 (see FIG. 3) with the cleaning substrate 14 and simultaneously, sequentially and/or subsequently remove lint and/or other contaminants from the rollers 50a, 50b, 60a, 60b and r/w/s heads 75 with the adhesive substrate 16 with the same cleaning sheet 10 simply by feeding the cleaning sheet into the media path (i.e., reading, writing, scanning and/or printing path) of the electronic equipment.

Figure 1B:
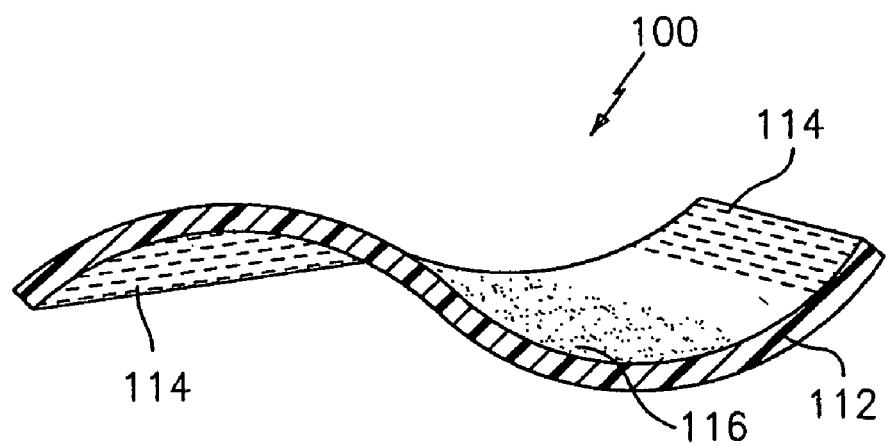
FIG. 1B is a perspective view of another embodiment of the cleaning sheet of FIG. 1 showing the first surface coated with both the cleaning substrate and the adhesive substrate.

FIG. 1B shows another embodiment of the present disclosure wherein one surface of the cleaning sheet 100 is coated with the cleaning substrate 114 selected from the above group and the same surface is also at least partially coated with the adhesive substrate 116. As can be appreciated, this enables the user to clean and remove contaminants from all of the rollers 50a, 50b, 60a, 60b and r/w/s heads with one pass of the cleaning sheet 100. Alternatively, both sides of the lapping film 112 can be coated with both the cleaning substrate 114 and the adhesive substrate 116.

As can be appreciated by the present disclosure, an alcohol-based cleaning solution is not used to clean the r/w/s heads 75 and/or the rollers 50a, 50b, 60a, 60b since it is commonly known that repeated cleaning with alcohol-based solutions, e.g., isopropyl alcohol and the like, may cause detrimental effects on the rollers and/or r/w/s heads, e.g., repeated cleaning with an alcohol-based solutions may affect the overall elasticity of the rollers.

Figure 2A:
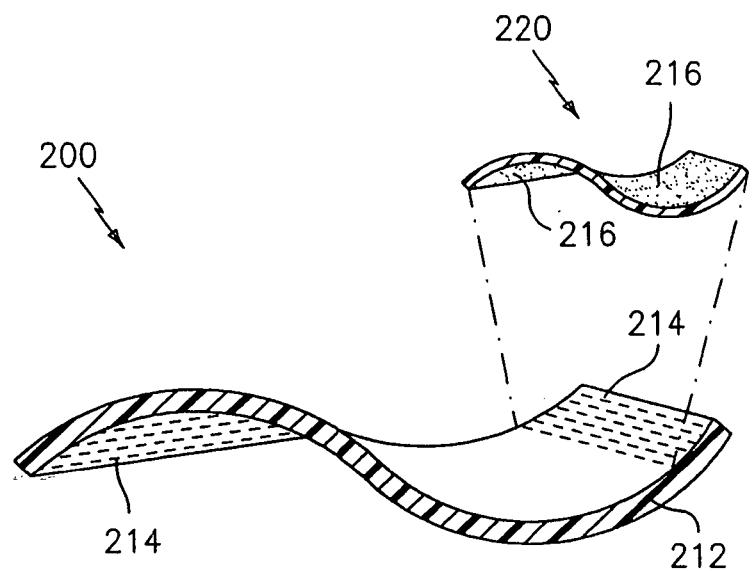
FIG. 2A is a perspective view with parts separated of another embodiment of the cleaning sheet of FIG. 1 showing both the first and second surfaces of the cleaning sheet coated with the cleaning substrate and showing a card-like material coated on both sides with adhesives.

FIG. 2A shows another embodiment of the cleaning sheet 200 wherein a card-like adhesive material/substrate 216 having adhesive qualities on both sides is applied to the lapping film 212 to remove contaminants in a similar manner as described above. It is envisioned that the adhesive 216 used to affix the adhesive material 220 to the lapping film 212 may be the same or different than the adhesive 216 used to clean the rollers 50a, 50b, 60a, 60b and/or r/w/s heads 75. The adhesive material 220 may be affixed to the lapping film 212 manually prior to inserting the cleaning sheet 200 within the electronic equipment or may be affixed to the lapping film 212 during the manufacturing process.

Figure 2B:
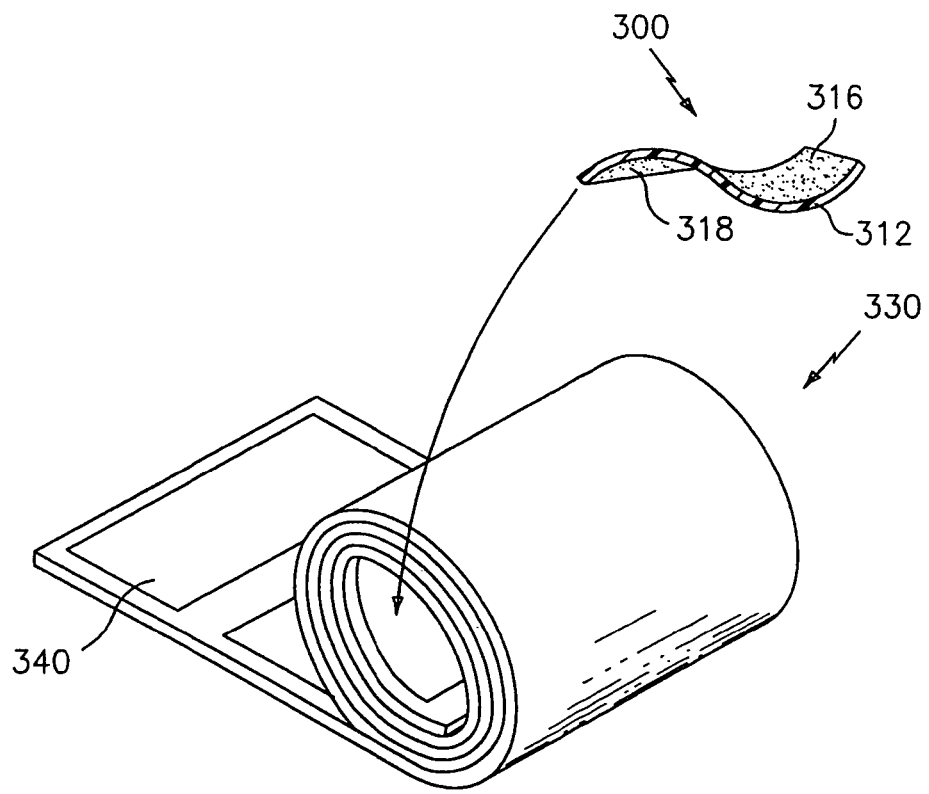
FIG. 2B is a perspective view with parts separated of the card-like material of FIG. 2A prior to attachment to a prefabricated roll of printer labels.

For example, FIG. 2B shows one location of an adhesive strip 300 adhered to a roll 330 of labels 340. Adhesive strip 300 may include one adhesive 318 used to affix the strip 300 to the label roll 330 and a second adhesive 316 designed to remove lint or other debris from the r/w/s heads and/or rollers disposed along the label printing path. Alternatively, the adhesive strip 300 may be affixed to the label roll 330 (or, as the case may be, label fanfold) in any known manner, e.g., thermal bonding and the like. Adhesive 318 may be selected from a group of adhesives having high adhesive characteristics, i.e., high tack level or strength level, to assure affixation to the label roll 330.

It is envisioned that by manufacturing the roll 330 of labels 340 in this fashion, i.e., with the adhesive strip 300 included at the end of the roll 330 of labels 340 eliminates manual cleaning of the labeling device, i.e., eliminates the need for users to clean/decontaminate the label path after a certain number of uses. As can be appreciated by the present disclosure, the adhesive strip 300 can be applied to the label roll 330 in lieu of the last label 340 or, alternatively, several adhesive strips 300 can be incorporated with the label roll 330 to decontaminate/clean the labeling device on a more frequent basis. Alternatively, the adhesive strip 300 can be sold separately and manually applied to any roll of labeling stock in the same manner as described above with respect to FIG. 2A.

Figure 3:
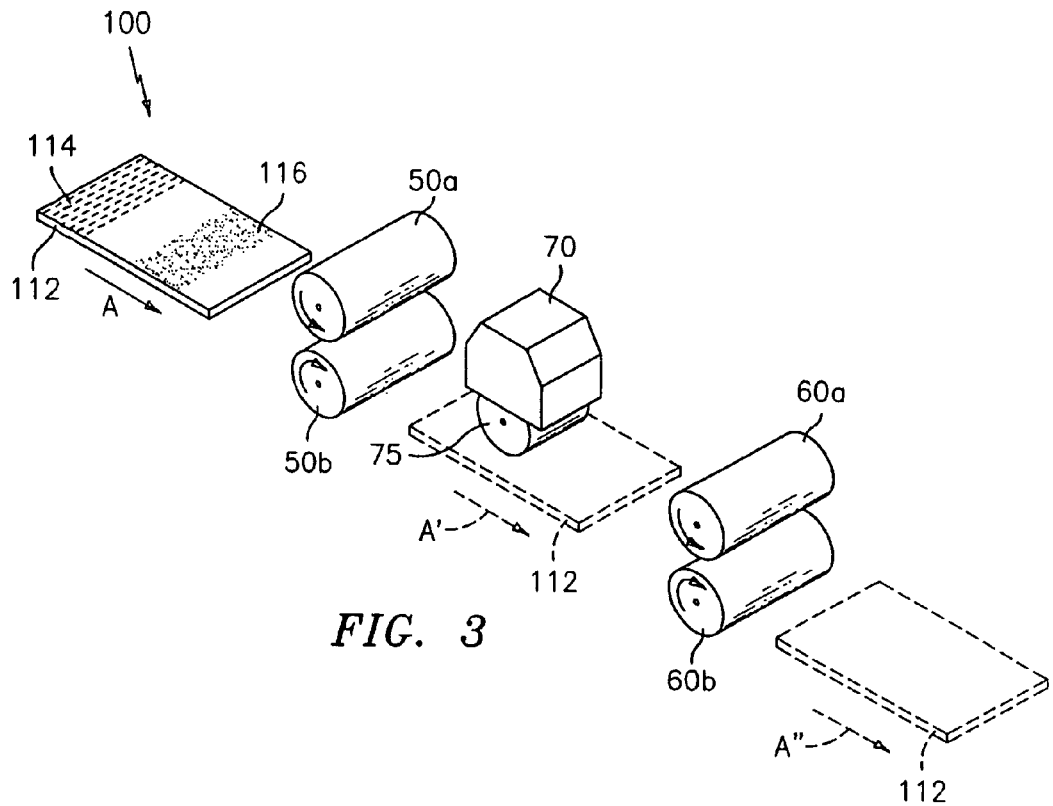
FIG. 3 is a schematic diagram showing the cleaning sheet of FIG. 1 as it moves through a predetermined media path (shown in phantom)

Turning now to FIG. 3 which shows a schematic diagram of the cleaning sheet 100 as it is inserted through a pair of feeding rollers 50a and 50b along a predetermined media path designated by arrows "A", "A'" and "A"". More particularly, cleaning sheet 100 which, as mentioned above and by way of example, includes the cleaning substrate 114 and adhesive 116 disposed on the same side of lapping film 112, is initially inserted through rollers 50a and 50b which conjointly rotate inwardly to draw the cleaning sheet 100 through the path (i.e., from arrow A to arrow A'). As cleaning sheet 100 is drawn through rollers 50a and 50b, the adhesive substrate 116 removes any contaminants on roller 50a and subsequently (or sequentially) the cleaning substrate 114 cleans roller 50a.

As the cleaning sheet 100 is drawn along the cleaning path from A to A' and from A' to A", the r/w/s head 70 which may include or incorporate other components, e.g., magnetic heads, optics, and/or the like, is subsequently decontaminated and cleaned in the same manner as roller 50a. Likewise, roller 60a is decontaminated and cleaned as the cleaning sheet 100 is drawn between rollers 60a and 60b.

Again, it is envisioned that the cleaning substrate 114 and adhesive substrate 116 may be disposed on both sides of the lapping film 112 which, obviously, eliminates the need to repeat the cleaning process to clean bottom rollers 50b and 60b. Moreover, in some cases it may be preferable to insert the cleaning sheet 100 such that the cleaning substrate 114 initially cleans the roller 50a prior to the adhesive substrate 116 removing any contaminants which may result during cleaning. Still, in other cases it may be preferable to include a plurality of cleaning substrate strips 114 with alternating adhesive strips 116 disposed along the same or opposite sides of the lapping film 112 depending upon a particular purpose or to promote better or more effective cleaning and polishing of the rollers 50a, 60a and/or r/w/s head(s) 75.

It is envisioned that any of the aforedescribed cleaning sheets, i.e., 10, 100, 200, 300 and/or 400 (or any combination thereof) may be used in the same or similar manner to clean various types of electronic equipment.

The present disclosure also relates to a method for cleaning and decontaminating the internal working components of a piece of electronic equipment along a predetermined media path. The method includes the steps of:

1) providing a base material 12 having first and second surfaces, 13 and 15, respectively, the base material having a cleaning substrate 14 disposed on the first surface 13 and an adhesive substrate 16 disposed on the second surface 15;

2) inserting the base material 12 into the electronic equipment along the predetermined media path (e.g., from A to A' to A" in FIG. 3); and 3) moving the base material 12 through the predetermined media path such that the cleaning substrate 14 cleans and polishes at least one internal working component of the electronic equipment and the adhesive substrate 16 decontaminates at least one internal working component of the electronic equipment.

At least one of the first and second surfaces 13, 15, respectively, of the base material of the providing step may include both a cleaning substrate 14 and an adhesive substrate 16.

The method can also include additional steps, e.g.:

4) removing the base material 12 from the electronic equipment;

5) reorienting the base material 12 such that the other of the first and second surfaces 13, 15, respectively, is oriented to contact at least one additional internal working component of the electronic equipment; and 6) moving the base material through the predetermined media path such that one of the cleaning substrate 14 and the adhesive substrate 16 contacts the at least one additional internal working component of the electronic equipment.

Figure 4:
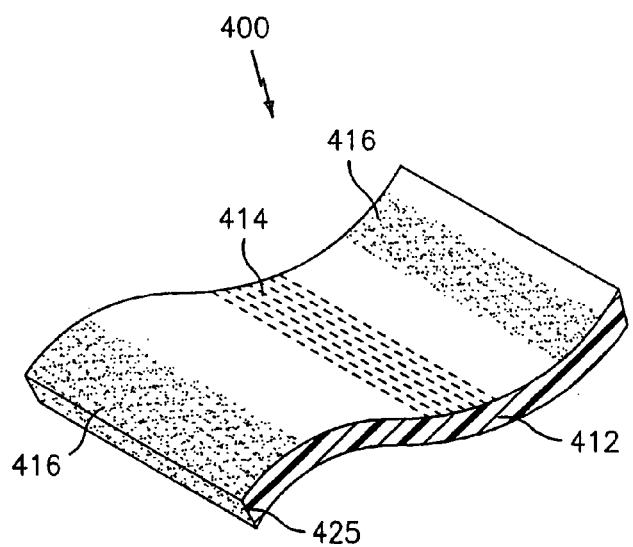
FIG. 4 is a perspective view of another embodiment of the present disclosure showing the adhesive substrate disposed over the leading edge of the base material.

From the foregoing and with reference to the various figure drawings, those skilled in the art will appreciate that certain modifications can also be made to the present disclosure without departing from the scope of the same. For example, the adhesive substrate described herein with respect to cleaning sheets 10, 100, 200 and 300 may include any commercially known adhesive, epoxy or glue with varying adhesive strengths. Moreover, the adhesive and/or cleaning substrates may be applied in a specific pattern depending upon a particular purpose or to achieve a particular result, e.g., alternating pattern, tab-like pattern or stripe-like pattern. Moreover and as best illustrated in the cleaning apparatus 400 of FIG. 4, the adhesive substrate 416 and/or the cleaning substrate 414 may be applied to an edge 425 of the base material 412 to accomplish the purposes of the present disclosure, i.e., clean and decontaminate the internal working components of a piece of electronic equipment. It is envisioned that edge 425 may include the leading, trailing or side edges of the base material 412 and/or any combination thereof.

Figure 5:
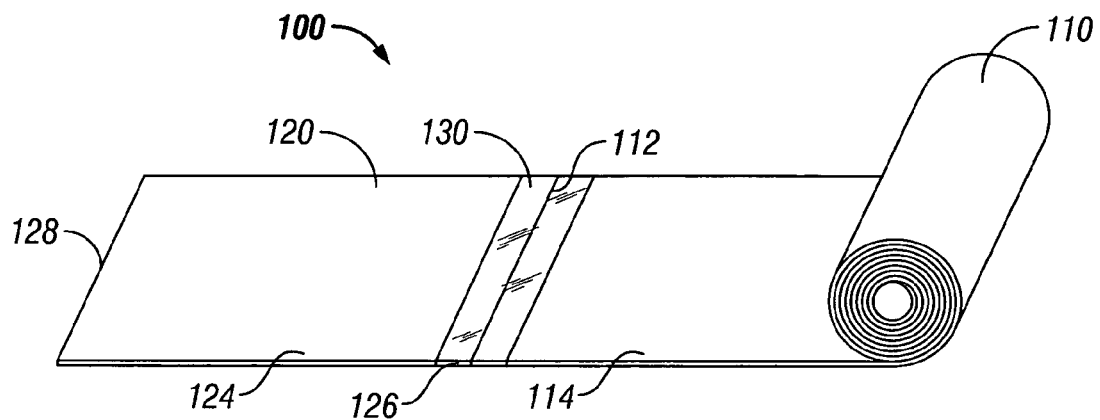
FIG. 5 is a perspective view of another embodiment of the present disclosure having a base material and a cleaning sheet.

In FIG. 5, cleaning apparatus is generally referred to by reference numeral 100. Cleaning apparatus 100 includes a base material 110 e.g., a printer ribbon or a lapping film, which may be made from polyurethane, polyvinylchloride (PVC), acrylic, PET, ABS, thermoplastic, polyester and/or thermoresin or any combination thereof which includes a leading end 112 and a trailing end (not shown). It is envisioned that base material 110 can also include acrylic foam, urethane, polyethylene with synthetic paper, cardboard stock, paper, non-woven paper, fiber and/or synthetic suede. Base material 110 may also vary in thickness depending upon a particular purpose and/or the particular piece of electronic equipment being cleaned. Base material 110 also includes a first surface 114 and a second surface (not shown) opposite the first surface 114.

Cleaning apparatus 100 also includes a cleaning sheet 120. Cleaning sheet 120 includes a first surface 124, a second surface (not shown) opposite the first surface 124, a distal end 126 and a proximal end 128. Cleaning sheet 120 may be abrasive, smooth or any texture in between, and is for cleaning internal working components of a piece of electronic equipment, such as a printer head. In one embodiment, the cleaning sheet 120 is coated with aluminum oxide on the first surface 124 and/or the second surface.

An adhesive strip 130 is included to adhere the base material 110 to the cleaning sheet 120. The adhesive strip 130 may be attached to either surface of the base material 110 and to either surface of the cleaning sheet 120. At least the distal end 126 of cleaning sheet 120 may be attached, via the adhesive strip 130, proximate the leading end 112 of the base material 110.

In use, to clean the internal working components of a piece of electronic equipment, e.g., a printer, a user loads the cleaning apparatus 100 into a printer (not shown). It is envisioned that the base material 110 in this embodiment is a roll of printer ribbon. The cleaning apparatus 100, including a printer ribbon, can be loaded into a printer as one would typically load a printer ribbon. The cleaning sheet 120 at the leading end 112 of the base material 110 would ensure that the printer heads (and/or other internal parts) are cleaned before using the new printer ribbon. A user feeds the cleaning sheet 110 through the printer, thus cleaning the printer heads (and/or other internal parts) and putting the base material 110 (printer ribbon) in a position for typical use.

Figure 6:
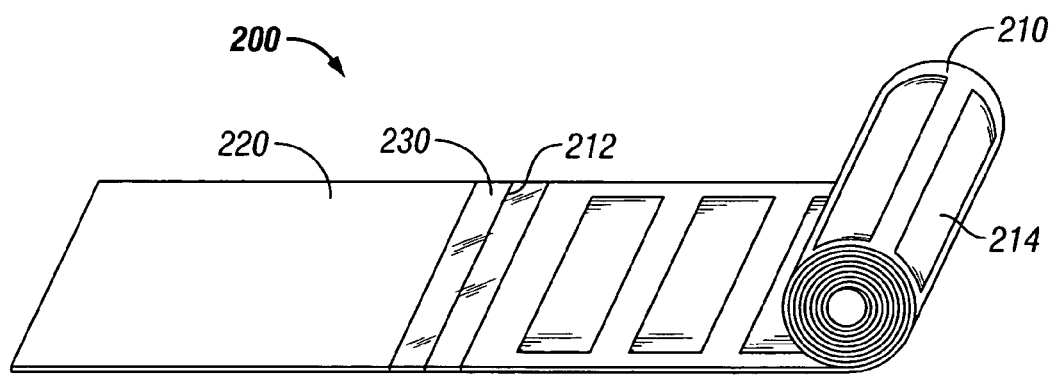
FIG. 6 is a perspective view of a apparatus of FIG. 5 illustrated with the base material having a plurality of labels.

The cleaning apparatus illustrated in FIG. 6 is generally referred to by reference numeral 200. The base material 210 of cleaning apparatus 200 comprises a plurality of labels 214. Similar to the embodiment illustrated in FIG. 5, the base material 210 is attached to a cleaning sheet 220 via an adhesive strip 230 disposed proximate a leading end 212 of base material. The base material 210 with the plurality of labels 214 can be fed into the printing path of a printer. In this embodiment, the cleaning sheet 220 would clean the printing path of a printer.

The present disclosure also relates to a method of cleaning a head of a printer. This method includes the steps of:

1) providing a base material 110 having a leading end 112 and a trailing end;

2) providing an abrasive cleaning sheet 120 with distal and proximal ends and being disposed proximate the leading end 112 of the base material 110, at least the distal end of the abrasive cleaning sheet 120 is adhered to the base material 110;

3) feeding the base material 110 into the printing path of a printer when the printer is disposed in a normally-engaged position; and 4) moving the base material 110 at least partially through a printer such that the cleaning sheet 120 contacts at least a head of a printer.

Still, further, although the present disclosure teaches away from the use of alcohol-based cleaning solutions and alcohol-based adhesives due to the various complications known in the industry and described above, it is not beyond the scope of the present disclosure to apply an alcohol-based adhesive during the manufacturing process which evaporates or otherwise dries and forms an adhesive substrate on the lapping film.

Moreover, it is not beyond the scope of the presently disclosed cleaning apparatus to utilize the cleaning apparatus with certain electronic equipment which may require repeatedly moving the cleaning apparatus through the r/w/s heads or rollers to accomplish both cleaning and decontaminating the internal working components of the electronic device. For example, certain magnetic or card readers are classified as swipe readers or dip and insert readers which may require reinsertion of the cleaning apparatus in a different orientation to promote more effective cleaning and/or decontamination of the internal working components.

While several embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of preferred embodiments. Those skilled in the art will envision other modifications within the scope and spirit of the claims appended hereto.

What is claimed is:

1. A method of cleaning a head of a printer, comprising the steps of:

providing a base material having first and second surfaces and a leading end and a trailing end;

providing an abrasive cleaning sheet having distal and proximal ends, an adhesive substrate being disposed on at least one of the first and second surfaces of the base material and proximal to the abrasive cleaning sheet, the abrasive cleaning sheet and the adhesive substrate being disposed proximate the leading end of the base material and being adapted to clean at least one of reading, writing and scan heads (r/w/s heads) of a printer when the printer is disposed in a normally-engaged position, at least the distal end of the abrasive cleaning sheet being adhered to the leading end of the base material;

feeding the base material into a printing path of a printer when the printer is disposed in a normally-engaged position; and moving the base material at least partially through a printer such that the abrasive cleaning sheet contacts at least a head of the printer.

2. The method of cleaning a head of a printer according to claim 1, wherein the base material of the providing step comprises labels.

3. The method of cleaning a head of a printer according to claim 1, wherein the abrasive cleaning sheet of the providing step is coated with aluminum oxide.

4. The method of cleaning a head of a printer according to claim 1, wherein the adhesive substrate of the providing step has first and second surfaces, one of the first and second surfaces of the adhesive substrate having an adhesive material disposed thereon which adheres the adhesive substrate to the base material and to the abrasive cleaning strip.

5. The method of cleaning a head of a printer according to claim 4, wherein the adhesive material of the providing step is disposed on the first and second surfaces of the adhesive substrate.

* * * * *